US007873065B1

(12) United States Patent
Mukerji et al.

(10) Patent No.: US 7,873,065 B1
(45) Date of Patent: Jan. 18, 2011

(54) SELECTIVELY ENABLING NETWORK PACKET CONCATENATION BASED ON METRICS

(75) Inventors: Arindum Mukerji, Seattle, WA (US); Jesse Abraham Rothstein, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 739 days.

(21) Appl. No.: 11/344,687

(22) Filed: Feb. 1, 2006

(51) Int. Cl.
*H04L 12/54* (2006.01)
(52) U.S. Cl. .................. 370/429; 370/353; 370/395.41
(58) Field of Classification Search .................. 370/229, 370/235, 238, 351, 352, 353, 389, 395.1, 370/395.4, 395.42; 709/201, 203, 223, 224, 709/246
See application file for complete search history.

(56) References Cited

U.S. PATENT DOCUMENTS

| 4,021,782 | A | 5/1977 | Hoerning |
| 4,054,951 | A | 10/1977 | Jackson et al. |
| 4,316,222 | A | 2/1982 | Subramaniam et al. |
| 4,386,416 | A | 5/1983 | Giltner et al. |
| 4,593,324 | A | 6/1986 | Ohkubo et al. |
| 4,626,829 | A | 12/1986 | Hauck |
| 4,701,745 | A | 10/1987 | Waterworth et al. |
| 4,862,167 | A | 8/1989 | Copeland, III |
| 4,876,541 | A | 10/1989 | Storer |
| 4,890,282 | A | 12/1989 | Lambert et al. |
| 4,897,717 | A | 1/1990 | Hamilton et al. |
| 4,906,991 | A | 3/1990 | Fiala et al. |
| 4,971,407 | A | 11/1990 | Hoffman |
| 4,988,998 | A | 1/1991 | O'Brien |
| 5,003,307 | A | 3/1991 | Whiting et al. |
| 5,016,009 | A | 5/1991 | Whiting et al. |
| 5,109,433 | A | 4/1992 | Notenboom |
| 5,126,739 | A | 6/1992 | Whiting et al. |
| 5,146,221 | A | 9/1992 | Whiting et al. |
| 5,150,430 | A | 9/1992 | Chu |
| 5,155,484 | A | 10/1992 | Chambers, IV |
| 5,167,034 | A | 11/1992 | MacLean, Jr. et al. |

(Continued)

OTHER PUBLICATIONS

About Computing & Technology, "Wireless/Networking, Nagle algorithm," visited Dec. 6, 2005, 2 pages, <http://compnetworking.about.com/od/tcpip/l/bldef_nagle.htm>.

(Continued)

*Primary Examiner*—Chi H Pham
*Assistant Examiner*—Weibin Huang
(74) *Attorney, Agent, or Firm*—Frommer Lawrence & Haug LLP; Jamie L. Wiegand

(57) ABSTRACT

A method, system, and apparatus are directed towards selectively concatenating data into a packet to modify a number of packets transmitted over a network based on a combination of network and/or send-queue metrics. In one embodiment, Nagle's algorithm is used for concatenating data into a packet. The concatenation may be selectively enabled based on heuristics applied to the combination of metrics. In one embodiment, the result may indicate that there should be a concatenation, or that data should be sent immediately, or that a current state for whether to concatenate or not should be maintained. The heuristics may include an expert system, decision tree, truth table, function, or the like. The heuristics may be provided by a user, or another computing device. In another embodiment, the concatenation may be enabled based on a conditional probability determined from the combination of metrics.

32 Claims, 6 Drawing Sheets

U.S. PATENT DOCUMENTS

| | | | |
|---|---|---|---|
| 5,212,742 A | 5/1993 | Normile et al. |
| 5,249,053 A | 9/1993 | Jain |
| 5,280,600 A | 1/1994 | Van Maren et al. |
| 5,293,388 A | 3/1994 | Monroe et al. |
| 5,319,638 A | 6/1994 | Lin |
| 5,341,440 A | 8/1994 | Earl et al. |
| 5,367,629 A | 11/1994 | Chu et al. |
| 5,379,036 A | 1/1995 | Storer |
| 5,410,671 A | 4/1995 | Elgamal et al. |
| 5,414,425 A | 5/1995 | Whiting et al. |
| 5,463,390 A | 10/1995 | Whiting et al. |
| 5,479,587 A | 12/1995 | Campbell et al. |
| 5,488,364 A | 1/1996 | Cole |
| 5,504,842 A | 4/1996 | Gentile |
| 5,506,944 A | 4/1996 | Gentile |
| 5,539,865 A | 7/1996 | Gentile |
| 5,542,031 A | 7/1996 | Douglass et al. |
| 5,544,290 A | 8/1996 | Gentile |
| 5,546,395 A | 8/1996 | Sharma et al. |
| 5,546,475 A | 8/1996 | Bolle et al. |
| 5,553,160 A | 9/1996 | Dawson |
| 5,615,287 A | 3/1997 | Fu et al. |
| 5,638,498 A | 6/1997 | Tyler et al. |
| 5,768,445 A | 6/1998 | Troeller et al. |
| 5,768,525 A | 6/1998 | Kralowetz et al. |
| 5,774,715 A | 6/1998 | Madany et al. |
| 5,805,932 A | 9/1998 | Kawashima et al. |
| 5,825,890 A | 10/1998 | Elgamal et al. |
| 5,850,565 A | 12/1998 | Wightman et al. |
| 5,874,907 A | 2/1999 | Craft |
| 5,884,269 A | 3/1999 | Cellier et al. |
| 5,892,847 A | 4/1999 | Johnson |
| 5,951,623 A | 9/1999 | Reynar et al. |
| 5,991,515 A | 11/1999 | Fall et al. |
| 6,006,264 A | 12/1999 | Colby et al. |
| 6,052,785 A | 4/2000 | Lin et al. |
| 6,061,454 A | 5/2000 | Malik et al. |
| 6,070,179 A | 5/2000 | Craft |
| 6,098,108 A | 8/2000 | Sridhar et al. |
| 6,185,625 B1 | 2/2001 | Tso et al. |
| 6,223,287 B1 | 4/2001 | Douglas et al. |
| 6,243,761 B1 | 6/2001 | Mogul et al. |
| 6,314,465 B1 | 11/2001 | Paul et al. |
| 6,367,009 B1 | 4/2002 | Davis et al. |
| 6,442,140 B1 | 8/2002 | Kirschenbaum |
| 6,584,567 B1 | 6/2003 | Bellwood et al. |
| 6,598,071 B1 | 7/2003 | Hayashi et al. |
| 6,643,701 B1 | 11/2003 | Aziz et al. |
| 6,662,233 B1 | 12/2003 | Skarpness et al. |
| 6,674,717 B1 | 1/2004 | Duong-van et al. |
| 6,681,327 B1 | 1/2004 | Jardin |
| 6,718,388 B1 | 4/2004 | Yarborough et al. |
| 6,728,785 B1 | 4/2004 | Jungck |
| 6,757,255 B1 | 6/2004 | Aoki et al. |
| 6,810,411 B1 | 10/2004 | Coughlin et al. |
| 6,842,768 B1 | 1/2005 | Shaffer et al. |
| 6,973,622 B1 | 12/2005 | Rappaport et al. |
| 7,012,893 B2 * | 3/2006 | Bahadiroglu | 370/231 |
| 7,051,126 B1 | 5/2006 | Franklin |
| 7,126,955 B2 | 10/2006 | Nabhan et al. |
| 7,142,512 B1 | 11/2006 | Kobayashi et al. |
| 7,287,094 B2 | 10/2007 | Mogul |
| 7,293,094 B2 | 11/2007 | Vaman et al. |
| 7,296,089 B2 | 11/2007 | Krishnamurthy et al. |
| 7,299,300 B2 | 11/2007 | Desai et al. |
| 7,388,841 B2 * | 6/2008 | Shao et al. | 370/238 |
| 2002/0073238 A1 | 6/2002 | Doron |
| 2002/0199012 A1 | 12/2002 | Cable et al. |
| 2003/0028606 A1 | 2/2003 | Koopmans et al. |
| 2003/0126255 A1 | 7/2003 | Rice et al. |
| 2004/0010621 A1 | 1/2004 | Afergan et al. |
| 2004/0054805 A1 | 3/2004 | Sen et al. |
| 2004/0236826 A1 | 11/2004 | Harville et al. |
| 2005/0015765 A1 | 1/2005 | Covell et al. |
| 2005/0063303 A1 | 3/2005 | Samuels et al. |
| 2005/0074007 A1 | 4/2005 | Samuels et al. |
| 2005/0100014 A1 * | 5/2005 | Brown et al. | 370/389 |
| 2005/0108420 A1 | 5/2005 | Brown et al. |
| 2005/0187979 A1 | 8/2005 | Christensen et al. |
| 2005/0201383 A1 * | 9/2005 | Bhandari et al. | 370/395.42 |
| 2005/0265235 A1 | 12/2005 | Accapadi et al. |
| 2007/0261004 A1 | 11/2007 | Swildens et al. |

OTHER PUBLICATIONS

Australia's Academic and Research Network, "Programs and large MTU, Nagle algorithm," visited Dec. 9, 2005, 3 pages, <http://www.aarnet.edu.au/engineering/networkdesign/mtu/programming.html>.

Berners-Lee, T. et al., RFC 1945, "Hypertext Transfer Protocol—HTTP/1.0," May 1996, 51 pages.

Dierks, T. et al., RFC 2246, "The TLS Protocol, Verison 1.0," Jan. 1999, 80 pages.

Fielding, R. et al., RFC 2616, "Hypertext Transfer Protocol—HTTP/1.1," Jun. 1999, 114 pages.

fifi.org, "Manpage of TCP," visited Dec. 9, 2005, 6 pages, <http://www.fifi.org/cgi-bin/man2html/usr/share/man/man7/tcp.7.gz>.

Freier, A. et al., Netscape Communications Corporation, "The SSL Protocol, Version 3.0," Mar. 1996, 60 pages.

Kessler, G. et al., RFC 1739, "A Primer on Internet and TCP/IP Tools," Dec. 1994, 46 pages.

Nagle, J., RFC 896, "Congestion control in IP/TCP internetworks," Jan. 6, 1984, 13 pages.

OpenSSL, visited Apr. 12, 2006, 1 page, <www.openssl.org>.

Paxson, V., RFC 2525, "Known TCP Implementation Problems," Mar. 1999, 61 pages.

Rescorla, E. "SSL and TLS, Designing and Building Secure Systems", 2001, Addison-Wesley, 46 pages.

RSA Laboratories, "PKCS #1 v2.0: RSA Cryoptography Standard," Oct. 1, 1998, 35 pages.

SearchNetworking.com, "Nagle's algorithm," visited Dec. 6, 2005, 3 pages, <http://searchnetworking.techtarget.com/sDefinition/0,,sid7_gci754347,00.html>.

Tormasov, A. et at., "TCP/IP options for high-performance data transmission," visited Dec. 9, 2005, 4 pages, <http://builder.com.com/5100-6732-1050878.html>.

W3C, "HTTP/1.1 and Nagle's Algorithm," visited Dec. 6, 2005, 3 pages, <http://www.w3.org/Protocols/HTTP/Performance/Nagle/>.

"HTTP Compression Speeds up the Web", pp. 1-5 can be found at http://www.webreference.com/internet/software/ servers/http-compression/, accessed Dec. 30, 2004.

"Use HTTP Compression", pp. 1-4, can be found at http://www.websiteoptimization.com/speed/tweak/compress/, accessed Dec. 30, 2004.

"AppCelera: Smart Compression", pp. 1-5, can be found at http://www.eweek.com/article2/0,1759,755242,00.asp, accessed Dec. 30, 2004.

Srinivasan Seshan et al., "SPAND: Shared Passive Network Performance Discovery", USENIX Symposium on Internet Technologies and Systems, 1997, pp. 1-18.

R. Fielding et al., "Hypertext Transfer Protocol—HTTP/1.1", IETF, RFC 2616, pp. 1-165, 1999.

Cheng, J.M., et al. "A fast, highly reliable data compression chip and algorithm for storage systems," IBM, vol. 40, No. 6, Nov. 1996, 11 pgs.

Simpson, W. "The Point-To-Point Protocol (PPP)," RFC 1661, Jul. 1994, 54 pgs.

Schneider, K., et al. "PPP for Data Compression in Data Circuit-Terminating Equipment (DCE)," RFC 1976, Aug. 1996, 10 pgs.

Castineyra, I., et al. "The Nimrod Routing Architecture," RFC 1992, Aug. 1996, 27 pgs.

Degermark, Mikael et al., "Low-Loss TCP/IP Header Compression for Wireless Networks," J.C. Baltzar AG, Science Publishers, Oct. 1997, pp. 375-387.

"Direct Access Storage Device Compression and Decompression Data Flow," IBM Technical Disclosure Bulletin, vol. 38, No. 11, Nov. 1995, pp. 291-295.

"Drive Image Professional for DOS, OS/2, and Windows," WSDC Dowload Guide, http://wsdcds01.watson.ibm.com/ WSDC.nsf/Guides/Download/Applications-Drivelmage.htm, accessed Nov. 22, 1999, 4 pgs.

"Drive Image Professional," WSDC Download Guide, http://wsdcds01.watson.ibm.com/wsdc.nsf/Guides/Download/ Applications-Drivelmage.htm, accessed May 3, 2001, 5 pgs.

Electronic Engineering Times, Issue 759, Aug. 16, 1993, 37 pgs.

Adaptive Lossless Data Compression - ALDC, IBM, Jun. 15, 1994, 2 pgs.

ALDC1-5S - Adaptive Lossless Data Compression, IBM Microelectronics, May 1994. 2 pgs.

ALDC1-20S - Adaptive Lossless Data Compression, IBM Microelectronics, May 1994, 2 pgs.

ALDC1-40S - Adaptive Lossless Data Compression, IBM Microelectronics, May 1994, 2 pgs.

ALDC-MACRO - Adaptive Lossless Data Compression, IBM Microelectronics, May 1994, 2 pgs.

Craft, David J., "Data Compression Choice No. Easy Call," Computer Technology Review, Jan. 1994, 2 pgs.

"Data Compression Applications and Innovations Workshop," Proceedings of a Workshop held in conjunction with the IEEE Data Compression Conference, Mar. 31, 1995, 123 pgs.

IBM Microelectronics Comdex Fall 1993 Booth Location, 1 pg.

"IBM Technology Products Introduces New Family of High-Performance Data Compression Products," IBM Coporation, Somers, NY, Aug. 16, 1993, 6 pgs.

Zebrose, Katherine L., "Integrating Hardware Accelerators into Internetworking Switches," Telco Systems, 10 pgs., date unknown.

Readme, Powerquest Corporation, 6 pgs., Copyright 1994-1999.

Costlow, Terry "Sony designs faster, denser tape drive," Electronic Engineering Times, May 20, 1996, 2 pgs.

Electronic Engineering Times, Issue 767, Oct. 11, 1993, 34 pgs.

"IBM Announces New Feature for 3480 Subsystem," Tucson Today, vol. 12, No. 337, Jul. 25, 1989, 1 pg.

Craft, D.J. "A fast hardware data compression algorithm and some algorithmic extensions," IBM Journal of Research and Development, vol. 42, No. 6, Nov. 1998, 14 pgs.

"Magstar and IBM 3590 High Performance Tape Subsystem Technical Guide," IBM, Nov. 1996, 287 pgs.

Restriction Requirement in U.S. Appl. No. 10/957,024, mailed Jul. 9, 2009, 5 pgs.

Advisory Action in U.S. Appl. No. 10/957,024, mailed Apr. 1, 2009, 3 pgs.

Final Rejection in U.S. Appl. No. 10/957,024, mailed Jan. 23, 2009, 32 pgs.

Non-final Rejection in U.S. Appl. No. 101957,024 mailed Feb. 6, 2008, 27 pgs.

Postel, "RFC879 - TCP maximum segment size and related topics", Nov. 1983, 13 pgs.

Jacobson et ai, "RFC1 072 - TCP extensions for long-delay paths", Oct. 1988, 33 pgs.

Wang et ai, "TCP startup Performance in Large Bandwidth Delay Networks", IEEE, 2004, pp. 796-805.

Eric Weisstein's World of Mathematics, "Smoothing" Jul. 2000, 1 pg.

FOLDOC, "definition of maximum segment size", http://foldoc.org/?maximum+size, Mar. 6, 1998, 1 pg.

Non-Final Rejection in U.S. Appl. No. 10/957,024, mailed Nov. 9, 2009, 36 pgs.

\* cited by examiner

|  | 402 | 404 | 406 | 408 |
|---|---|---|---|---|
|  | Bandwidth | Latency | Loss | Enable Concatenation? |
| 410 | High | High | High | Either |
| 411 | High | High | Low | Disable |
| 412 | High | Low | High | Enable |
| 413 | High | Low | Low | Enable |
| 414 | Low | High | High | Either |
| 415 | Low | High | Low | Enable |
| 416 | Low | Low | High | Enable |
| 417 | Low | Low | Low | Enable |

SELECTIVELY ENABLING NETWORK PACKET CONCATENATION BASED ON METRICS

BACKGROUND OF THE INVENTION

The invention relates generally to communicating content over a network, and more particularly but not exclusively to selectively determining whether to concatenate data into a packet based on a network and/or send-queue metric.

Nagle's algorithm concatenates data into a packet to modify a number of packets transmitted over a network. Nagle's algorithm concatenates data into a packet until an acknowledgement (ACK) is received or a predetermined amount of data is concatenated in the packet. Subsequently, the packet is enabled to be transmitted over the network. Nagle's algorithm, named after John Nagle is described in Request for Comments (RFC) 896 (available at http://www-.faqs.org/rfcs/rfc896.html).

While the use of a concatenation may improve behavior for a network, such use may penalize high latency network connections. For example, a high latency network connection may delay the ACK message for the previous message sent, thereby delaying transmission of data. Alternatively, a network device may send a network packet as soon as it is available. This mode of operation, however, may result in many small packets being sent over the network connection, which may result in an unduly high load over the network connection. Therefore, there is a need in the industry to improve how network packets are managed. Thus, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein:

FIG. 4 illustrates one embodiment of a truth table used for determining when to concatenate data into a packet based on a network and/or send-queue metric;

DETAILED DESCRIPTION OF THE INVENTION

Figure 1:
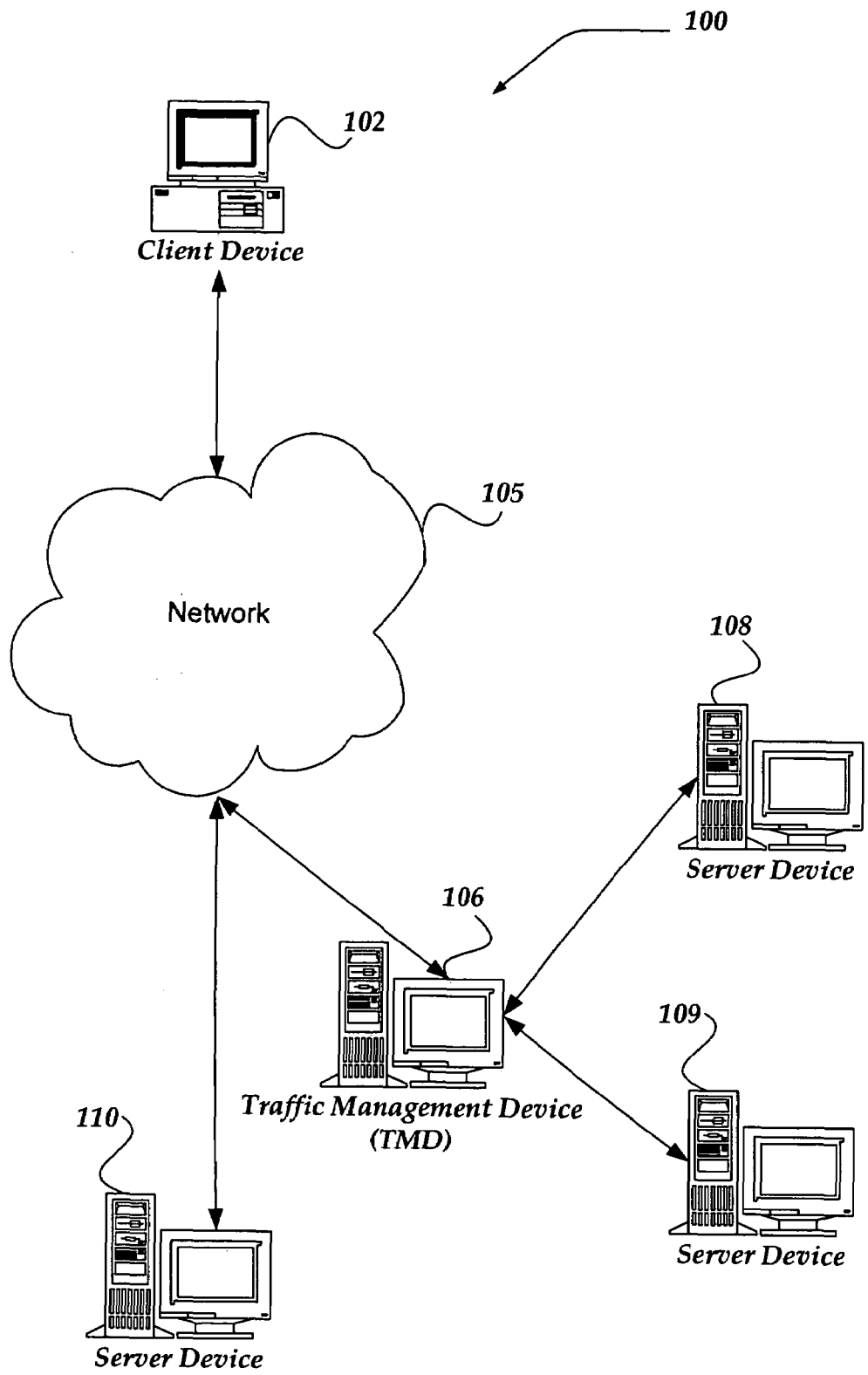
FIG. 1, illustrates one embodiment of an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the invention is directed towards a system, apparatus, and method for selectively combining data into a network packet to reduce the number of packets transmitted over a network based on one or more network and/or send-queue metrics.

In one embodiment, the invention may selectively coalesce the data into the network packet. Coalescing may include combining the data in a manner that may modify the data. For example, in one embodiment, coalescing of the data may result in making a resultant data smaller in length, longer in length, or the like, than a sum of the length of individual parts of the data. In one embodiment, selectively coalescing the data may be performed by selectively delaying sending of the data of the first packet over the network for a time period. For example, the data may be coalesced until a timeout event occurs, or the like, and then subsequently sent over the network. In another embodiment, selectively coalescing the data may be performed by selectively modifying a time period for sending the data. In one embodiment, selectively modifying a time period may include selectively reducing the time period or selectively extending the time period, or the like. In another embodiment, selectively coalescing data into the network packet may comprise selectively concatenating data into the network packet.

In one embodiment, data of a first packet is concatenated with data of a second packet at least partly based on the at least one metric. The concatenation may comprise buffering the data of the first packet at least until the data of the second packet is received and generating the network packet using the buffered data and the data of the second packet.

In another embodiment, received data is combined and/or coalesced with data into a network packet based in part on at least one network metric. The combined and/or coalesced result may be further processed by compressing, encrypting, encoding, interleaving the result, or the like, and sent over the network.

In one embodiment, if it is determined to concatenate the data, such concatenation may continue until an acknowledgement (ACK) is received or a predetermined amount of data is concatenated in the packet. In one embodiment, after the ACK is received or the predetermined amount is concatenated, the packet is enabled to be transmitted over the network. In one embodiment, concatenation of data is terminated if a timeout is reached, or the like. In one embodiment, Nagle's algorithm, or an algorithm substantially adhering to Nagle's algorithm, is used for concatenating data into a packet.

Concatenation of data for additional network packets may continue until the network metrics and/or queue metrics indicate that concatenation is to be terminated. When concatenation is inhibited (e.g. not performed), the invention enables data to be packaged into a network packet and sent over the network virtually as soon as the data is available.

Selective concatenation of data based on dynamic evaluations of network metrics enable improved management of overall payload sizes of packets, a number of network packets transmitted, and an improved management of network resources as conditions change.

The network metrics may include a round trip time (RTT), a bandwidth metric, a maximum segment size (MSS), a type of application level protocol utilized, a latency, a packet loss, a jitter, a quality of service, or the like. The send-queue metrics may include a time spent in a send-queue, a depth of the send-queue, or the like. In one embodiment, the evaluation of the send-queue metric may include a comparison of a time data spends in a send-queue when concatenation of data is performed to another time other data spends in the send-queue when data is immediately sent over the network (e.g., absent of concatenation) rather than being concatenated. In one embodiment, evaluation of the send queue metric may include a comparison of one or more send queue metrics with a predetermined threshold, a mean send queue metric over a period of time, or another dynamically determined threshold.

The value of the metrics (i.e. network and/or send-queue) may be qualitative or numeric. In one embodiment, the qualitative values may include "High," "Medium," "Low," or the like.

The metrics may be determined for a type of network connection between devices. The type of network connection may include virtually any identifying information associated with the network connection. For example, the type of network connection may include an identity of a device associated with the network connection, an identity of the device and a gateway, a type of the device, and/or the gateway, an identity of the network associated with the network connection, or the like.

The concatenation may be selectively enabled based on heuristics applied to the combination of the metrics. In one embodiment, the result may indicate that there should be a concatenation, or that data should be sent immediately, or that a current state for whether to concatenate or not should be maintained. The heuristics may employ a conditional test that compares the metric to a threshold to provide the result. The heuristics may include an expert system, decision tree, truth table, function, or the like. The heuristics may be provided by a user, or another computing device.

One heuristic may be to selectively concatenate data, if a latency metric is above a threshold and the bandwidth metric is above another threshold. Another heuristic may be to selectively concatenate data, if a combination of the latency metric and the bandwidth metric is above yet another threshold. In another embodiment, another heuristic may be to selectively concatenate data, if a bandwidth metric is below a threshold or the latency metric is below another threshold.

In another embodiment, the concatenation may be enabled based on a conditional probability determined from a combination of metrics. In general, the invention may be implemented on any network device, including a server device, a client device, a proxy device, a traffic management device, a transaction aware device, or the like.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client device 102, network 105, traffic management device (TMD) 106, and server devices 108-110. Client device 102 is in communication with TMD 106 and server device 110 through network 105. TMD 106 is in further communication with server devices 108-109. Although not shown, TMD 106 may be in communication with server devices 108-109 through a network infrastructure that is similar to network 105.

Generally, client device 102 may include virtually any computing device capable of connecting to another computing device to send and receive information, including web requests for information from a server, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may further include a client application that is configured to manage various actions. Moreover, client device 102 may also include a web browser application, that is configured to enable an end-user to interact with other devices and applications over network 105.

Client device 102 may communicate with network 105 employing a variety of network interfaces and associated communication protocols. Client device 102 may, for example, use various dial-up mechanisms with a Serial Line IP (SLIP) protocol, Point-to-Point Protocol (PPP), and the like. As such, client device 102 may transfer content at a low transfer rate, with potentially high latencies. For example, client device 102 may transfer data at about 14.4 to about 46 kbps, or potentially more. In another embodiment, client device 102 may employ a higher-speed cable, Digital Subscriber Line (DSL) modem, Integrated Services Digital Network (ISDN) interface, ISDN terminal adapter, or the like. As such, client device 102 may be considered to transfer data using a high bandwidth interface varying from about 32 kbps to over about 622 Mbps, although such rates are highly variable, and may change with technology.

Network 105 is configured to couple client device 102, with other network devices, such as TMD 106, server device 110, or the like. Network 105 is enabled to employ any form of computer readable media for communicating information from one electronic device to another. In one embodiment, network 105 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as client device 102, and the like, with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between client device 102 and TMD 106.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

TMD 106 includes virtually any device that manages network traffic. Such devices include, for example, routers, proxies, firewalls, load balancers, cache devices, application accelerators, devices that perform network address translation, any combination of the preceding devices, or the like. TMD 106 may control, for example, the flow of data packets delivered to or forwarded from an array of server devices, such as server devices 108-109. TMD 106 may direct a request for a resource to a particular server device based on network traffic, network topology, capacity of a server, content requested, and a host of other traffic distribution mechanisms. TMD 106 may receive data packets from and transmit data packets to the Internet, an intranet, or a local area network accessible through another network. TMD 106 may recognize packets that are part of the same communication, flow, and/or stream and may perform special processing on such packets, such as directing them to the same server device so that state information is maintained. TMD 106 also may support a wide variety of network applications such as Web browsing, email, telephony, streaming multimedia and other traffic that is sent in packets. The BIG-IP® family of traffic managers, by F5 Networks of Seattle, Wash., are examples of TMDs. In one embodiment, TMDs 106 may be integrated with one or more of servers 108-109, and provide content or services in addition to the TMD functions described herein.

TMD 106 may receive requests from client device 102. TMD 106 may select a server device from server devices 108-109 to forward the request. TMD 106 may employ any of a variety of criteria and mechanisms to select the server, including those mentioned above, load balancing mechanisms, and the like. TMD 106 may receive a response to the request and forward the response to client device 102.

In one embodiment, server devices may be geographically distributed from each other. In one embodiment, TMD 106 may make a decision as to which server device is best configured to respond to a request from client 102, based on whether the client 102 is connected to the network 105 with a high bandwidth connection. TMD 106 may then either forward a communication to the selected server device or cause the client request to be redirected to the selected server. HTTP redirection may be used to redirect the client request, in one embodiment.

TMD 106 may be implemented using one or more personal computers, server devices, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An embodiment of a network device that could be used as TMD 106 is network device 200 of FIG. 2, configured with appropriate software.

Servers 108-110 may include any computing device capable of communicating packets to another network device. Each packet may convey a piece of information. A packet may be sent for handshaking, i.e., to establish a connection or to acknowledge receipt of data. The packet may include information such as a request, a response, or the like. Generally, packets received by server devices 108-110 will be formatted according to TCP/IP, but they could also be formatted using another transport protocol, such as SCTP, X.25, NetBEUI, IPX/SPX, token ring, similar IPv4/6 protocols, and the like. Moreover, the packets may be communicated between server devices 108-110, TMD 106, and client device 102 employing HTTP, HTTPS, and the like.

In one embodiment, server devices 108-110 are configured to operate as a website server. However, server devices 108-110 are not limited to web server devices, and may also operate a messaging server, a File Transfer Protocol (FTP) server, a database server, content server, and the like. Additionally, each of server devices 108-110 may be configured to perform a different operation. Thus, for example, back-end server device 108 may be configured as a messaging server, while back-end server device 109 is configured as a database server. Moreover, while server devices 108-110 may operate as other than a website, they may still be enabled to receive an HTTP communication.

Devices that may operate as server devices 108-110 include personal computers, desktop computers, multiprocessor systems, microprocessor-based or programmable consumer electronics, network PCs, server devices, and the like.

A network device, such as client device 102, TMD 106, or at least one of server devices 108-110 may determine various metrics associated with a network connection and/or a send-queue. In one embodiment, the network device may be a transaction aware device. A transaction aware device is a device that is enabled to detect a boundary, as defined by an application, within a network communication data stream.

Such a data stream may include a stream of packets, or the like. The boundary represents an end of a transaction, and/or a start of another transaction.

Based, in part, on a network and/or send-queue metrics, the network device may selectively enable a concatenation of data into a packet to modify a number of packets transmitted, or to not concatenate the data and rather immediately send data over the network when it is available. The network device may selectively enable the concatenation based on a result of heuristics applied to a combination of the metrics.

In one embodiment, another network device may receive the various metrics from the network device. The other network device may selectively enable another concatenation based on the received various metrics. Thus, for example, TMD 106, or a network device (not shown) may determine the various metrics, and provide the metrics to client device 102, and/or at least one of server devices 108-110. Client device 102, and/or the at least one server device, may then employ the received metrics to selectively enable the concatenation of data.

It is further noted that terms such as client and server device may refer to functions within a device. As such, virtually any device may be configured to operate as a client device, a server device, or even include both a client and a server device function. Furthermore, where two or more peers are employed, any one of them may be designated as a client or as a server, and be configured to confirm to the teachings of the present invention.

Illustrative Network Device

Figure 2:
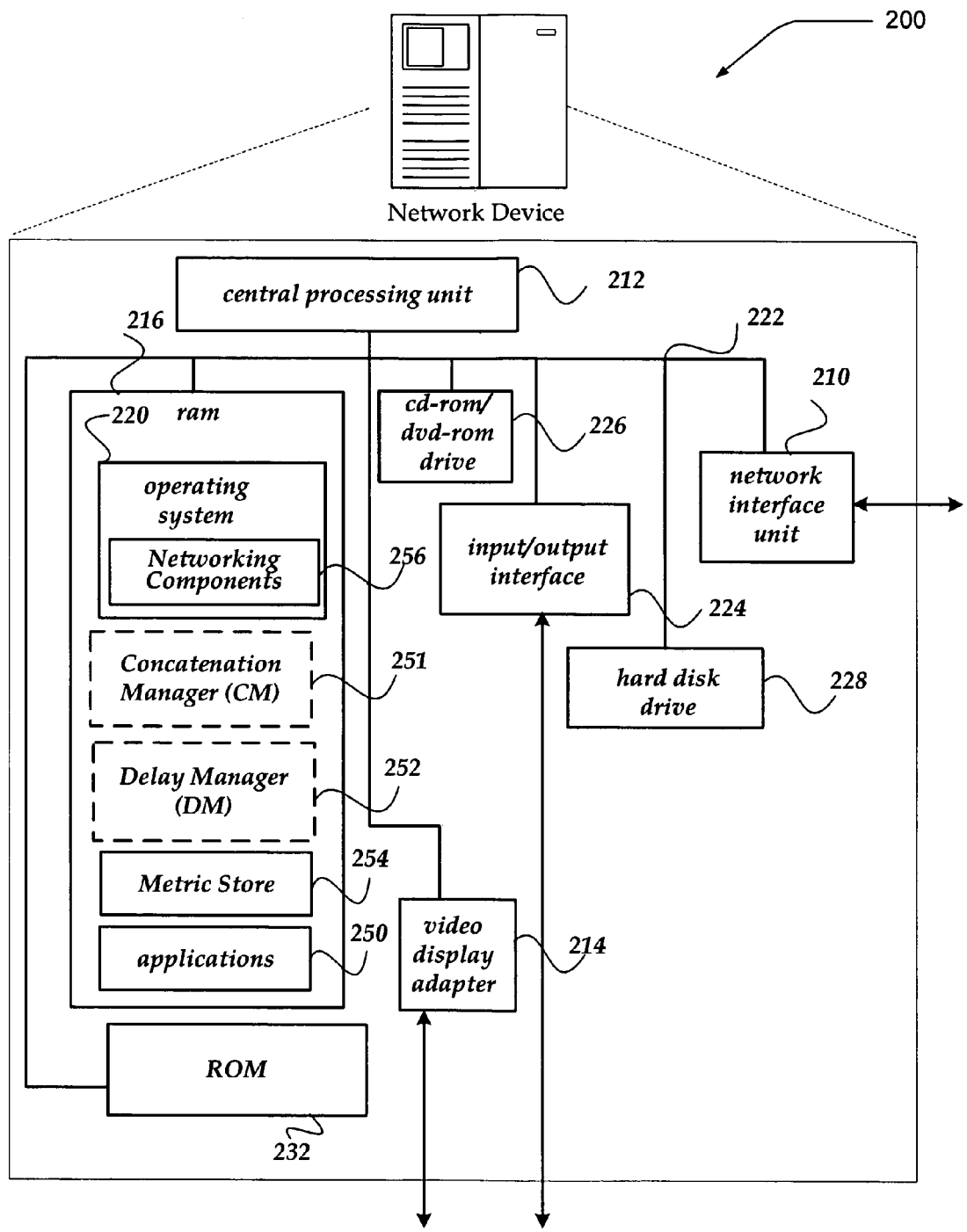
FIG. 2 illustrates one embodiment of a network device that may be included in a system implementing the invention.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, TMD 106, server devices 108-110, or even client device 102 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Operating system 220 may further include networking components 256. Network device 200 also includes metric manager (MM) 251, concatenation manager (CM) 252, and metric store 254.

As illustrated in FIG. 2, network device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include email programs, routing programs, schedulers, calendars, database programs, word processing programs, HTTP programs, traffic management programs, security programs, and so forth.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including TLS, TTLS, EAP, SSL, IPSec, and the like. Similarly, network device 200 may include applications that support a variety of tunneling mechanisms, such as VPN, PPP, L2TP, and so forth.

Network device 200 may also include input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, and the like.

In one embodiment, the network device 200 includes at least one Application Specific Integrated Circuit (ASIC) chip (not shown) coupled to bus 222. The ASIC chip can include logic that performs some of the actions of network device 200. For example, in one embodiment, the ASIC chip can perform a number of packet processing functions for incoming and/or outgoing packets. In one embodiment, the ASIC chip can perform at least a portion of the logic to enable the operation of MM 251 and/or CM 252.

In one embodiment, network device 200 can further include one or more field-programmable gate arrays (FPGA) (not shown), instead of, or in addition to, the ASIC chip. A number of functions of the network device can be performed by the ASIC chip, the FPGA, by CPU 212 with instructions stored in memory, or by any combination of the ASIC chip, FPGA, and CPU.

Networking components 256 may include, for example, various components to manage operations of an Open Systems Interconnection (OSI) network stack, including Internet Protocol (IP), TCP, UDP, SSL, HTTP, content encoding (e.g., content compression), and similar network related services. Networking components 256 may include a send-queue enabled to buffer messages and/or data before sending the messages over a network. Networking components 256 may utilize a transceiver, such as network interface unit 210, to send the messages over the network. Networking components 256 may be enabled to employ a concatenation of data into a packet to modify a number of packets and/or payload size of the packets transmitted over a network. Networking components 256 may provide a mechanism for enabling the concatenation, or enabling immediately sending data when it is available (e.g., absent of concatenation).

Metric store 254 may include any structure that may be employed to store various network and/or send-queue metrics, including a table, spreadsheet, folder, database, text file, or the like. The metrics may be stored based on a type of network connection between devices. The type of network connection may include an identity of a device associated with the network connection, identity of the device and a gateway, a type of the device, and/or gateway, identify of the network associated with the network connection, or the like. The type of the device indicate whether the device is a mobile device, a server device, a proxy device, personal computer, or the like. The type of network connection may indicate whether the network connection is a LAN, WAN, dial-up connection, a DSL connection, high speed connection, or the like.

The network metrics may include a round trip time (RTT), a bandwidth metric, a maximum segment size (MSS), a type of application level protocol utilized, a latency, a packet loss, a jitter, a quality of service, or the like. The send-queue metrics may include a time spent in a send-queue, a depth of the send-queue, or the like. The present invention may utilize more, less, or other metrics, without departing from the scope of the invention. The value of the metrics may be a qualitative or numeric value. In one embodiment, the values may be "High," "Medium," "Low," or the like.

Latency refers to an amount of time it takes for a packet to travel from one point to another point. Latency may be measured for a case where the points are different (i.e. one-way latency), or where the points are the same point (i.e. round-trip latency). Latency may be due to propagation speeds, transmission medium (e.g. optical fiber, wireless, or the like), hardware and software of intermediaries (e.g. routers, gateways, switches, or the like), and/or other computer and storage delays. One-way latency is a measure of time from a source sending a packet to a destination receiving it. Round-trip latency, sometimes referred to as round trip time (RTT), is a measure of time from the source sending a packet to the source receiving a response.

RTT typically is employed to determine how long to wait before a packet segment may be deemed to have been dropped during a network transmission and another packet is to be sent. That is, RTT is one metric that may be employed to handle network packet loss during a network communication. Additionally, the RTT metric may also be employed as a mechanism for estimating a client's data latency. For example, an RTT metric value around 400 msec may indicate a high latency client network connection, whereas a value around 10 msec may indicate a low-data latency client network connection. Because an RTT may require time to converge to a representative value of the network connection, RTT may represent a smoothed estimate. In one embodiment, RTT may be a smoothed round trip time, including round trip times that are sampled and smoothed over an interval to minimize impact of outliers, and/or possible aberrant readings from a packet drop, and the like.

RTT may be determined in any of a variety of ways. RTT can be determined by a single measurement or by combining multiple measurements, such as smoothing, averaging, or the like. For example, in one technique, an RTT estimate, which is included in the TCP protocol, may be determined based on a time delta between two or more TCP segments exchanged between communicating network endpoints. In another technique, one or more packets may be sent to a target device to elicit a response, and the time until a response packet is received from the target device, or an intermediary device, is measured. TCP packets, ICMP packets, and UDP packets, are examples of packets that can be used to obtain an RTT measurement. Thus, as used herein, determining an RTT includes at least all of the above techniques, unless clearly limited otherwise.

A high latency client may not necessarily be a low-bandwidth network connection client, however. For example, a satellite link, trans-Atlantic link, and the like, may have high latencies, but may also be high bandwidth connections. Thus, additional metrics may also be collected. In one embodiment, the network metrics may also include a type of link, a geographical distance from a source node to a destination node, a topological distance from the source node to the destination node (e.g. number of hops), or the like. In this embodiment, data may be selectively combined and/or coalesced into a network packet to reduce the number of packets transmitted over a network based at least on one of these network metrics.

MSS typically represents a maximum TCP segment size that is not exceeded for a length of a data field in a TCP packet. For example, Ethernet offers a Maximum Transmission Unit (MTU) of about 1500 bytes. Ethernet typically offers, for example, an MSS around 1460 bytes for the TCP payload. A typical TCP/IP broadband connection may be between about 1148 to about 1460 bytes, with IPv6 connections typically being around 1440 bytes. MSS values in the 1300-1400 byte range may further indicate a use of a tunneling protocol or VPN, such as Point-to-Point Protocol over Ethernet (PPPoE), and the like. MSS values around 536 bytes tend to indicate the network connection may be a SLIP, PPP, or similar dial-up connection. Thus, the invention may collect and employ MSS metrics to further determine whether to concatenate data as described herein. In one embodiment of the invention, MSS metrics may be used to determine whether the network connection with a client device is a high-latency, low-bandwidth link.

RTTs may typically not be deterministic or constant due to non-linear inducements of latency by intermediaries on a network connection, network congestion, timing drift, route changes, or the like. Jitter is a measure of a variation in a time-delay of packets being received (e.g., a variation in latency or RTT over multiple measurements).

Bandwidth as used herein refers to an amount of data that may be placed on a network connection in a given time period (e.g. for a RTT). Bandwidth may be expressed in bits per second (bps).

A type of application level protocol utilized by a network connection refers to the application specific mechanism used for processing a packet. In one embodiment, application level protocols are defined at the application layer (OSI Layer 7). The type of application level protocol may be determined by the data included in a transferred packet and/or the port utilized by the network connection. Examples, of various types of application level protocols include, but are not limited to HTTP, HTTPS, SMTP, FTP, NNTP, or the like.

Packet loss refers to a discarding of packets transferred over a network connection when a device is overloaded and cannot accept an incoming data, or the like. Packet loss may also refer to a failure of packets to reach its destination within a given time period.

Quality of Service (QoS) refers to the probability of a network connection meeting a given traffic contract, or refers to the probability of a packet succeeding in passing between two devices in the network. A traffic contract may specify guarantees for the ability of a network connection and/or protocol to give guaranteed performance, throughput, latency bounds, or the like, based on mutually agreed measures between the two devices.

The time spent in the send-queue refers to a maximum time, average time, or the like, that a packet, or data to be inserted into a packet, spends in a send-queue before it is sent to a recipient. Depth is a measure of an average number, maximum number, or the like, of messages in the send-queue.

MM 251 may be configured to receive various network and/or send-queue information from networking components 256. Based on the received information from networking components 256, MM 251 may determine various network and/or send-queue metrics. The information may be gathered, for example, by networking components 256 based on received packets, sent packets, or the like. MM 251 may store the metrics in a metric store 254. MM 251 may expose such metrics to CM 252. In one embodiment, MM 251 may be enabled to refine estimates of the metrics, and/or to determine another metric based on the received metrics. In one embodiment, refinement may include employing a variety of smoothing mechanisms to improve the estimates, including using a moving average approach, or the like. In one embodiment, the other metric may be based on a comparison of a time spent in a send-queue when concatenation of data into a packet is performed, and another time spent in the send-queue when data is immediately sent when available (e.g., absent of concatenation). In another embodiment, the other metric may be based on a comparison of a depth of a send-queue when concatenation is performed, and another depth of the send-queue when data is immediately sent when available. The comparisons may represent an effectiveness of performing the concatenation.

MM 251 may enable the metrics to be configurable. For example, MM 251 may provide an interface or the like which enables the metrics to be provided by a user or another computing device. In one embodiment, MM 251 may enable a user to combine one or more metrics. In one embodiment, for example, the user may implement a rule, condition, or the like, that employs a predetermined threshold value for a metric. Then, when the metric falls below the predetermined threshold, the associated network connection may be considered to be a high latency, low-bandwidth link.

CM 252 may be enabled to retrieve a network and/or send-queue metric, and to selectively concatenate data into a packet based on the metric(s). In one embodiment, CM 252 may selectively enable the concatenation based on heuristics applied to the combination of the metric(s). In one embodiment, CM 252 may enable networking components 256 to perform the concatenation. The heuristics are discussed in detail in conjunction with FIGS. 5-6. CM 252 may also enable a user and/or another component to configure the heuristics, through an interface, or the like. CM 252 may enable configuration of various rules, decisions, events, conditions, or the like. In one embodiment, the configuration may include employing an interpretative language, a programming language, or the like. CM 252 may employ a process such as described in conjunction with FIG. 3 or FIG. 4 below.

In another embodiment, CM 252 may enable selective concatenation based on a conditional probability determined from the combination of metrics. For example, CM 252 may non-deterministically enable selective concatenation based on a conditional probability. A conditional probability represents a probability of an event occurring, given that another event has already occurred. The conditional probability may be based on an occurrence of concatenating a data into a packet to modify a number of packets transmitted, and the concatenation being effective, given the occurrence of the other event(s).

Although illustrated in FIG. 2 as distinct components, networking components 256, metric store 254, MM 251, and CM 252 may be arranged, combined, or the like, in any of a variety of ways, without departing from the scope of the invention. For example networking components 256, metric store 254, MM 251, and CM 252 may be configured to operate a single component. Moreover, metric store 254, MM 251, and CM 252 may reside within operating system 220. Furthermore, in one embodiment, metric store 254, MM 251, and CM 252 may reside on different devices, such as TMD 106 of FIG. 1, server devices 108-110, or client device 102. CM 252 may be configured to retrieve the metrics from MM 251 and/or metric store 254 through a network communication, or the like. In one embodiment, MM 251 may be configured to receive various network information from networking components 256 through a network communication, or the like.

Illustrative Heuristics

Figure 5:
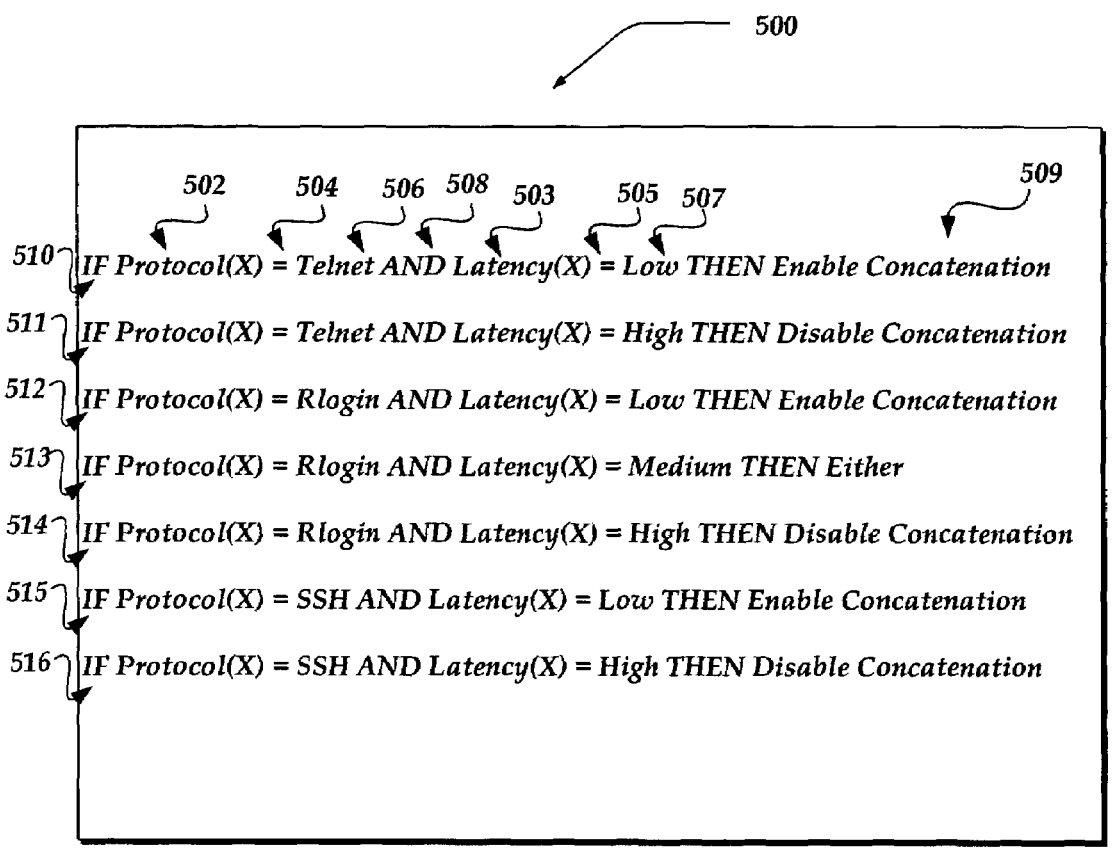
FIG. 5 illustrates one embodiment of an expert system used for determining when to concatenate data into a network packet based on a network and/or send-queue metric.

FIGS. 4-5 illustrate embodiments of heuristics useable for determining when to selectively concatenate data into a packet based on a network and/or send-queue metric. Although heuristics are shown as embodied by a truth table in FIG. 4, heuristics may be implemented using virtually any mechanism for decision-making based on conditions of the various network and/or send-queue metrics, including an expert system, a decision tree, a truth table, a function, or the like.

FIG. 4 illustrates one embodiment of a truth table used for determining whether to concatenate data into a packet based on a network and/or send-queue metric. In one embodiment, CM 252 of FIG. 2 may enable truth table 400. Truth table 400 may be embodied in a processor readable medium as processor executable instructions, or the like. Truth table 400 may include many more or less components than those shown. The components shown, however, are sufficient to disclose an illustrative embodiment for practicing the invention.

As shown in the figure, truth table 400 includes bandwidths 402, latencies 404, packet losses 406, and results 408. Truth table 400 also includes rows 410-417. Bandwidths 402, latencies 404, and packet losses 406 includes the qualitative value "High" and "Low" as one embodiment of possible values for the respective network metrics (e.g., bandwidth, latency, and packet loss). The values may be determined based on a comparison to a threshold, another network metric, or the like. Results 508 include the values "Enable," "Disable," and "Either."

In one embodiment, the values in results 408 may determine whether to concatenate data into a packet to modify a number of packets transmitted. For example, "Either" may indicate that a current state for whether to concatenate or not should be maintained. "Enable" may indicate that the concatenation should be performed. Similarly, "Disable" may indicate that data should be sent immediately when available.

As shown, row 410 may indicate the value "High" for bandwidths 402, "High" for latencies 404, and "High" for packet losses 406. If the network information indicates that the bandwidth is high, and the latency is high, and the packet loss is high, then a result is set to "Either." In one embodiment, if row 410 is not matched, then the network information is evaluated for a match against row 411. At row 411, for example, if bandwidth is high, and latency is high, and loss is low, then the result may indicate that the concatenation should be performed. Otherwise, and in one embodiment, a result may indicate that that data should be sent immediately when available. Matching evaluations may be performed until all rows have been processed. In one embodiment, matching evaluations may cease to be performed once one row has been matched. If no rows are matched, then a default, such as "Either," may be indicated as the result.

A program, script, or the like, may interpret rows 410-417 of truth table 400 to determine selectively enabling the concatenation. In one embodiment, the program, script, or the like may combine bandwidths 402, latencies 404, or packet losses 406, to derive a single rule, consistent with truth table 400. For example, row 410 and row 415 may be combined into a single rule: if latency is high and loss is high then a result is set to "Either." In another embodiment, the single rule may be: if latency is high and loss is high, then set the state to "Disable," else set the state to "Enable."

In one embodiment, the process of the invention may apply a logic such that if the bandwidth is high and the latency is high, concatenation is disabled, and for all other combinations, concatenation is enabled. In one embodiment, the logic may be such that concatenation is disabled if bandwidth is high, latency is high, and packet loss is low.

FIG. 5 illustrates one embodiment of an expert system used for determining whether to concatenate data into a packet based on a network and/or send-queue metric. In one embodiment, CM 252 of FIG. 2 may enable expert system 500. Expert system 500 may be embodied in a processor readable medium as processor executable instructions, or the like. Expert system 500 may include many more or less components than those shown. The components shown, however, are sufficient to disclose an illustrative embodiment for practicing the invention.

As shown, expert system 500 includes a plurality of rules 510-516. As shown, a rule begins with an "IF," followed by a conditional test, a "THEN," and a consequence 509. The conditional test compares the value of the network metric of a packet, "X," with compared values 506-507 to provide consequence 509. The condition test is shown as a logical expression, including Boolean operator 508, and predicates 502-503. However, the invention is not so limited. Any expression may be used, including a function call, or the like, without departing from the scope of the invention. Boolean operator may include "AND," "OR," "NOT," or the like. Predicates 502-503 include "Protocol(X)," and "Latency (X)," but may include any other expression referring to a network metric. "Protocol(X)" may be interpreted as the protocol for a packet and/or a stream of packets. "Latency(X)" may be interpreted as the latency for the packet. As shown, comparison operators 504-505 may be equivalence operators, but may be any comparison operator, such as a difference operator, an application of a function, or the like.

As shown, compared values 506-507 may be a qualitative value, such as "High," "Medium," or "Low." Compared values 506-507 may also be an identifier, a number, or the like. As shown, the identifier may include "Telnet," "Rlogin," or "SSH," but may be any other identifier. In one embodiment, compared values 506-507 may be a number, such as 500 msec.

If the conditional test for a rule is evaluated as true, then the consequence of the rule may indicate enabling the concatenation. As shown, a consequence of the rule may indicate that there should be a concatenation (e.g. "Enable Concatenation"), or that data should be sent immediately (e.g. "Disable Concatenation"), or that a current state for whether to concatenate or not should be maintained (e.g. "Either"). For example, rule 510 indicates selectively concatenating data into a packet to modify a number of packets transmitted if the protocol for a packet is "Telnet" and the latency for the packet is low.

A program, script, or the like, may interpret rules 510-516 to determine how to concatenate data into a packet based on a network and/or send-queue metric. In one embodiment, the rules are executed in an order, and the last provided consequence of a rule is provided as a result of expert system 500. In another embodiment, the rules are enabled as weighted heuristics. Weights (not shown) may be associated to each rule, and the consequence associated with a maximum summed weight, maximum average weight, or the like, is provided as a result of expert system 500.

Generalized Operation

Figure 3:
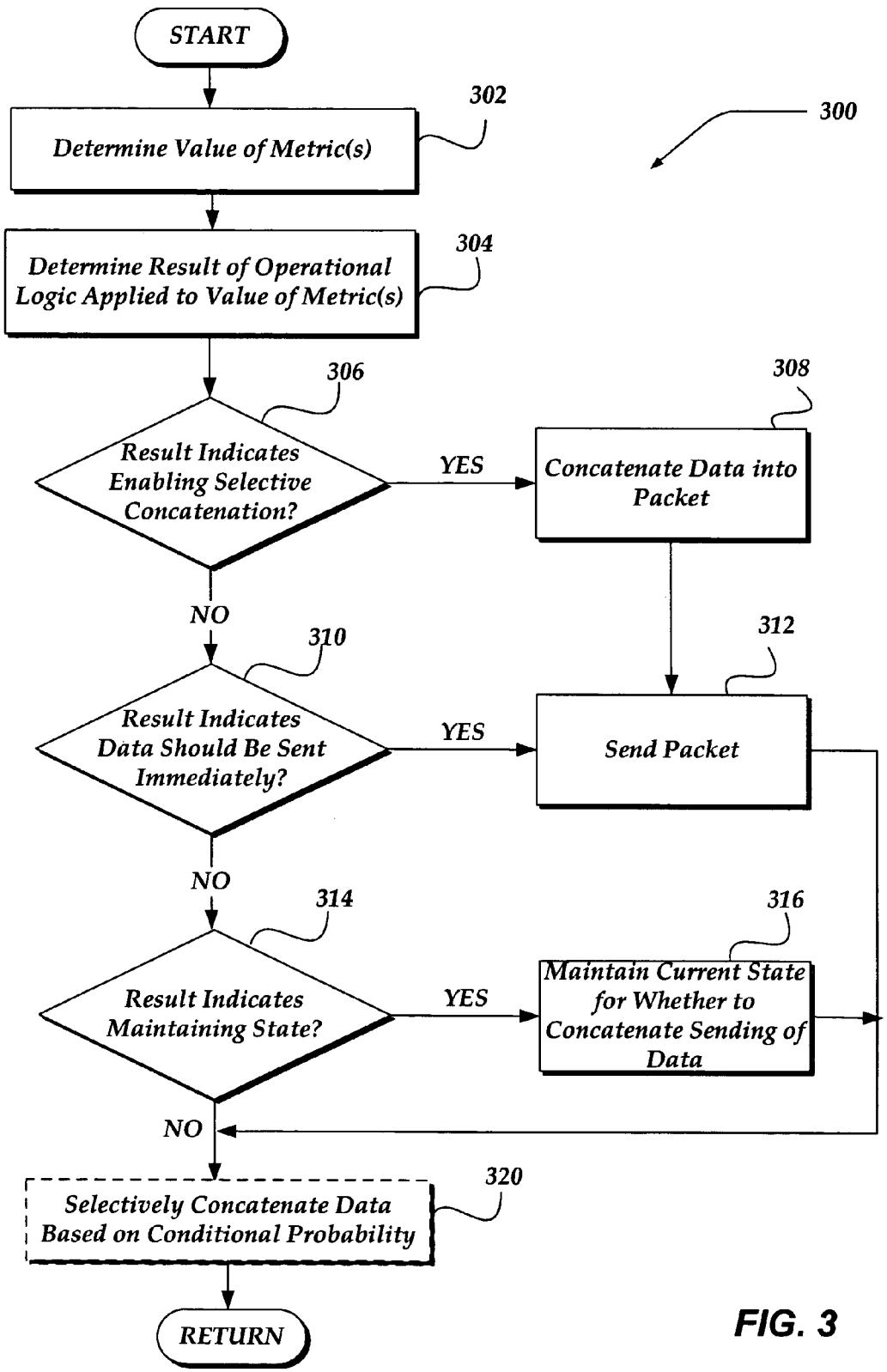
FIG. 3 illustrates a logical flow diagram generally showing one embodiment of a process for managing packets over a network using network and/or send-queue metrics.

The operation of certain aspects of the invention will now be described with respect to FIGS. 3 and 6. FIG. 3 illustrates a logical flow diagram generally showing one embodiment of a process for managing a communication with a client device using network and/or send-queue metrics. Process 300 of FIG. 3 may be implemented, for example, within CM 252 of FIG. 2.

Process 300 begins, after a start block, at block 302, where one or more values of one or more network and/or send-queue metrics for a network connection is determined. The network metrics may include a round trip time (RTT), a bandwidth metric, a maximum segment size (MSS), a type of application level protocol utilized, a latency, a packet loss, a jitter, a quality of service, or the like. The send-queue metrics may include a time spent in a send-queue, a depth of the send-queue, or the like. In one embodiment, the send-queue metric may be include a comparison of a time spent in a send-queue when concatenation of data into a packet to modify a number of packets transmitted over a network is performed, and another time spent in the send-queue when data is immediately sent when available (e.g., absent of concatenation). This metric may represent the effectiveness of performing the concatenation. In one embodiment, the metric may be determined by a configuration. For example, the metrics may be provided by a user, another mechanism, modified by the user, and/or modified by the other mechanism. In one embodiment, the network metric may be determined for a type of network connection between devices.

Processing continues next to block 304, where a result of heuristics applied to a value of the metric is determined. In one embodiment, the result may indicate that there should be a concatenation, or that data should be sent immediately, or that a current state for whether to concatenate or not should be maintained. One heuristic may be to selectively concatenate data into a packet, if the latency metric is above a latency threshold and the bandwidth metric is above a bandwidth threshold. Another heuristic may be to selectively concatenating data into a packet, if a combination of the latency metric and the bandwidth metric is above a threshold. Yet another heuristic may be to selectively concatenating data into a packet, if the bandwidth metric is below a bandwidth threshold or the latency metric is below a latency threshold.

Processing then continues to decision block 306, where it is determined if the result of heuristics indicates concatenating data into a packet to modify a number of packets transmitted. If it is determined that the result indicates concatenating, then processing continues to block 308, where the concatenation is performed. In one embodiment, the data is concatenated into a packet until an acknowledgement (ACK) is received or a predetermined amount of data is concatenated in the packet. In one embodiment, after the ACK is received or the predetermined amount is concatenated, processing continues to block 312 where the packet is enabled to be transmitted over the network. If at block 306, it is determined that the result does not indicate concatenating, processing continues to decision block 310.

At decision block 310, it is determined if the result of heuristics indicates sending data immediately. If it is determined that the result indicates sending data immediately, then processing continues to block 312, where data is sent immediately when available. For example, a segment to send may be included in a packet, and the packet sent to a recipient. Processing then continues to block 320. If at block 310, it is determined that the result does not indicate sending data immediately, processing continues to decision block 314.

At decision block 314, it is determined if the result of heuristics indicates maintaining a current state for whether to concatenate or not. If it is determined that the result indicates maintaining the current state, then processing continues to block 316. At block 316, the current state may be "Enabled" or "Disabled." The current state may be maintained by performing no operation, a no-op operation, another operation, or the like. Processing then continues to block 320. If at block 314, it is determined that the result does not indicate maintaining the current state, processing continues to block 320.

At block 320, and in one embodiment, selective concatenation may be enabled based on a conditional probability determined from a metric or a combination of metrics. In another embodiment, block 320 may not be performed and processing may return to a calling process for further processing. In one embodiment, the invention may non-deterministically enable selective concatenation based on the conditional probability. The conditional probability represents a probability of an event occurring, given that another event has already occurred. The conditional probability may be based on an occurrence of concatenating a data into a packet to modify a number of packets transmitted, and the concatenation being effective (i.e. a send-queue metric), given the occurrence of the other event(s). In one embodiment, the send-queue metric may include a comparison of a time spent in a send-queue when concatenation is performed, and another time spent in the send-queue when data is immediately sent when available. In one embodiment, the send-queue metric may include a comparison of a depth of a send-queue when concatenation is performed, and another depth of the send-queue when data is immediately sent when available. Processing then returns to calling process for further processing.

In an alternate embodiment, decision block 306 instead tests if the result indicates determining a number of packets to transmit, determining a packet payload to transmit, modifying a number of packets to transmit, or the like. If the determination is valid, processing continues to block 308. Similarly, in the alternate embodiment, at block 308 the number of packets and/or packet payload may be reduced, increased, or the like. A packet payload may represent a stream of packets, or the like. The number of packets and/or packet payload may be modified by concatenating data segments into a packet until an ACK is received and/or a predetermined amount of data has been concatenated. Processing then continues to block 312.

In an alternate embodiment, decision block 306 instead tests if the result indicates selectively combining a received data with another data into a network packet based in part on at least one network metric. Such combination may include concatenating, compressing, encrypting, encoding, interleaving, or the like. If the combination is to be performed, processing continues to block 308. Similarly, in the alternate embodiment, at block 308 the received data and the other data may be combined and/or coalesced into the network packet. Processing then continues to block 312.

Figure 6:
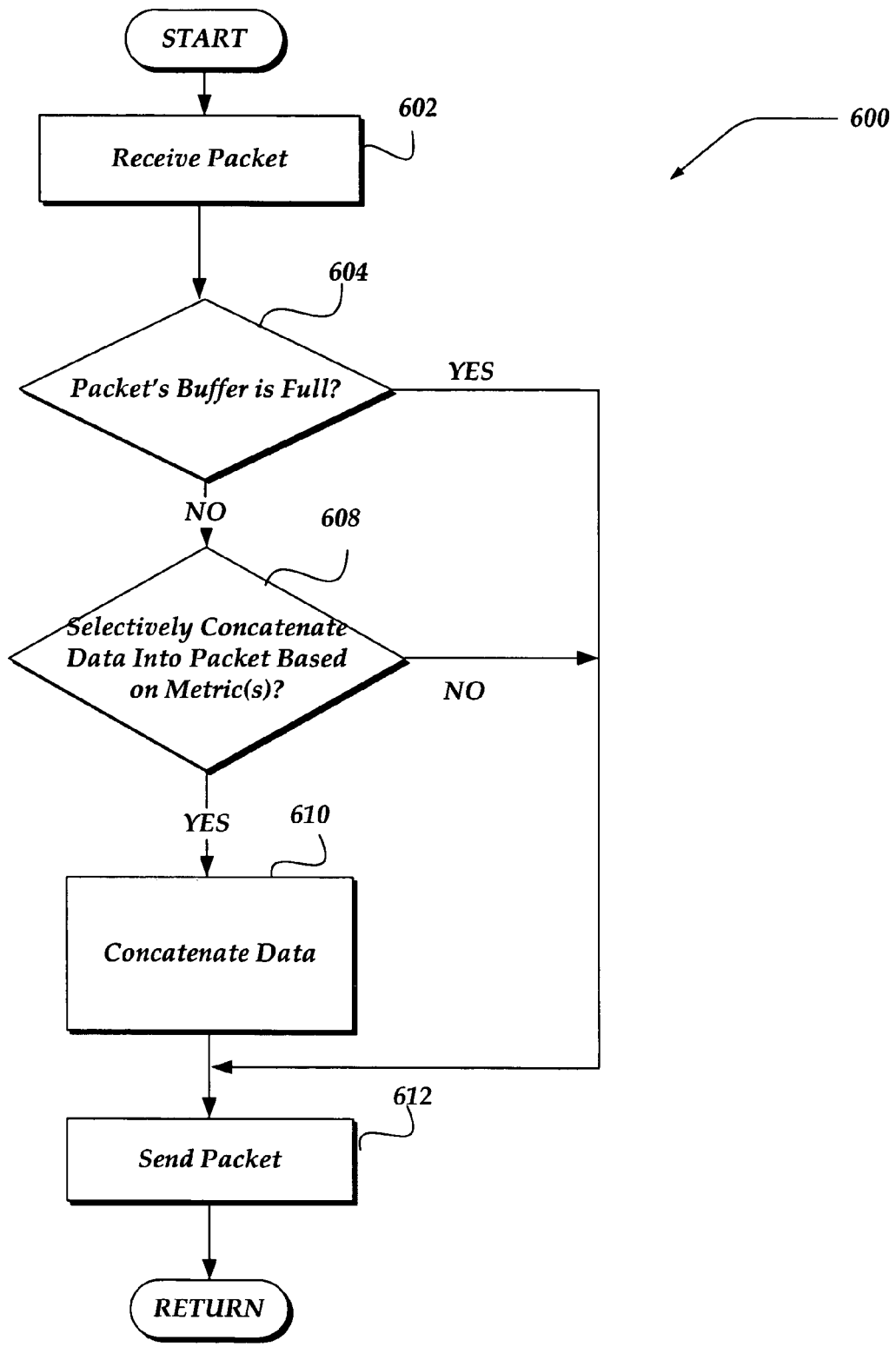
FIG. 6 illustrates a logical flow diagram generally showing one embodiment of a process for selectively enabling network packet concatenation based on network metrics, in accordance with the invention.

FIG. 6 illustrates a logical flow diagram generally showing one embodiment of a process for managing a communication with a client device Process 600 of FIG. 6 may be implemented, for example, within CM 252 of FIG. 2.

Process 600 begins, after a start block, at block 602, where a packet is received. A packet may be received from a network device, a calling process, a network component, such as networking component 256 of FIG. 2, or the like. A packet's predetermined size (packet buffer) may be as large as an MSS. A packet may include data up to a predetermined amount of data. Processing then continues to decision block 604.

At decision block 604, a determination is made whether the packet buffer is full. In one embodiment, it is determined whether the packet has accumulated a predetermined amount of data. If the packet has accumulated the predetermined amount of data then processing continues to block 612. Otherwise, processing continues to decision block 608.

At decision bock 608, a determination is made whether there should be a concatenation of data into a packet to modify a number of packets transmitted based on a networking metric. In one embodiment, heuristics are applied to a value of the network metric to determine if there should be a concatenation. For example, it is determined that there should be concatenation, if the latency metric is above a latency threshold, a bandwidth metric is above a bandwidth threshold and/or the packet loss metric is above a packet loss metric, or the like. If there should be a concatenation based on the networking metric, then processing continues to block 610. Otherwise, processing continues to block 612.

At block 610, data is concatenated into the packet and processing may wait for an accumulation of a predetermined amount of data in the packet (the packet buffer is full), for the receipt of an ACK, or for a timeout event to occur. For example, data may be concatenated into the packet until the predetermined amount of data is reached. In one embodiment, a data of a first packet is concatenated with another data. The other data may be provided by a second packet, a networking component, another component, a network API call, or the like. In one embodiment, the concatenated data is stored in the first packet. In another embodiment, data of the first packet is combined and/or coalesced with data of the second packet and stored in the first packet. The combined and/or coalesced result may be further processed by compressing, encrypting, encoding, interleaving the result, or the like. Therefore, concatenation and/or combination of the data further modifies the number of packets and/or a network packet's data payload size sent over the network. Processing then continues to block 612. In one embodiment, data of a subsequent received packet may be buffered into the packet until the packet buffer is full.

At block 612, the packet is sent. The sending of the packet may differ depending on whether the buffer is full, an ACK is received, or a timeout event occurs. For example, if the packet buffer is full, then the packet is sent as is. If packet buffer is not full, but an ACK is received or a timeout event occurs, then extra data may be padded into the packet, and the packet sent. Processing then returns to a calling process for further processing.

In an alternate embodiment, at block 610 data is instead coalesced into the packet and processing may wait for a predetermined time period. For example, the data may be coalesced until a timeout even occurs, or the like, and then subsequently sent over the network. In another embodiment, the time period for waiting may be based in part on the at least one metric. In one embodiment, the time period may be selectively modified by selectively reducing the time period or selectively extending the time period, or the like.

In at least some embodiments, sending the packet may include sending the data of the packet if the latency metric is above a latency threshold and the bandwidth metric is above a bandwidth threshold, or sending the concatenated data, if the latency metric is above a latency threshold and the bandwidth metric is above a bandwidth threshold.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for communicating data over a network, comprising:
    a transceiver to send and receive data over the network; and
    a processor that is operative to perform actions comprising:
        determining at least one metric, wherein at least one of the metrics is based on a comparison of a time data spends in a send-queue when concatenation is performed on the data to another time when other data spends in the send-queue in absence of concatenation of data;
        receiving a first packet of data for transmission over the network;
        selectively concatenating data of the first packet with data of a subsequently received second packet at least partly based on the at least one metric; and
        sending the data of the concatenated packet.

2. The network device of claim 1, wherein selectively concatenating the data further comprises selectively sending the first packet of data over the network prior to receiving the second packet.

3. The network device of claim 1, wherein selectively concatenating the data further comprises:
    buffering the data of the first packet until the data of the second packet is received; and
    generating a network packet using the buffered data and the data of the second packet.

4. The network device of claim 1, further comprising selectively delaying sending the data of the first packet over the network.

5. The network device of claim 1, wherein selectively concatenating the data further comprises terminating concatenation of data, if a timeout is reached.

6. The network device of claim 1, wherein selectively concatenating the data further comprises selectively applying Nagle's algorithm to concatenate the data.

7. The network device of claim 1, wherein selectively concatenating the data further comprises:
    selectively buffering the concatenated data until a third packet of data is received and
    concatenating the data of the third packet with the buffered data.

8. The network device of claim 1, wherein sending the data of the first packet further comprises, sending the data if a latency metric is above a latency threshold and a bandwidth metric is above a bandwidth threshold.

9. The network device of claim 1, wherein sending the data of the first packet further comprises sending the data as concatenated data based on a heuristic indicating that the data is to be sent immediately.

10. The network device of claim 1, wherein the at least one metric further comprises a bandwidth metric, a latency metric, and a packet loss metric.

11. The network device of claim 1, wherein sending the data further comprises sending the first packet absent concatenation.

12. The network device of claim 1, wherein the at least one metric comprises a network metric.

13. The network device of claim 1, wherein the at least one metric further comprises a depth of the send queue.

14. The network device of claim 1, wherein the at least one metric comprises a send queue metric and at least one metric selected from the group consisting bandwidth, latency, and packet loss.

15. A method useable in communicating data over a network, comprising:
    determining at least one metric that includes a send-queue metric that is based on a comparison of a depth of a send-queue when concatenation of data is performed to another depth of the send-queue in absence of concatenation of data;
    receiving a first packet of data for transmission over the network;
    selectively combining data of the first packet with data of a second packet at least partly based on the at least one metric, and if a combination of a latency metric and a bandwidth metric is above a threshold; and
    sending the selectively combined data over the network.

16. The method of claim 15, wherein selectively combining the data further comprises:
    combining the data if the bandwidth metric is below a bandwidth threshold or the latency metric is below a latency threshold.

17. The method of claim 15, wherein selectively combining the data further comprises using at least one of an expert system, decision tree, truth table, or a function.

18. The method of claim 15, wherein selectively combining the data further comprises at least one of enabling Nagle's algorithm, of disabling Nagle's algorithm, or of maintaining a current state of Nagle's algorithm.

19. The method of claim 15, further comprising:
    performing at least one of encryption or compression on the combined data prior to sending the combined data over the network.

20. A computer readable storage medium configured to include program instructions for performing the method of claim 15.

21. A network device for communicating data over a network, comprising:
    a transceiver to send and receive data over the network; and
    a processor that is operative to perform actions comprising:
        determining at least one metric that comprises a send-queue metric, wherein the send-queue metric is based on a comparison of a time data spends in a send-queue when concatenation of data is performed to another time another data spends in the send-queue in an absence of concatenation of data;
        receiving data; and selectively combining the received data with other data into a network packet based in part on the at least one metric.

22. The network device of claim 21, wherein the at least one metric further comprises a network metric is based on at least one of a qualitative or a numeric measure of round trip time (RTT), bandwidth, maximum segment size (MSS), type of application level protocol utilized, latency, packet loss, jitter, or quality of service.

23. The network device of claim 21, wherein the send-queue metric is based on at least one of a qualitative or a numeric measure of time data spends in a send-queue, or a depth of the send-queue.

24. The network device of claim 21, wherein the send-queue metric is based on a comparison of a depth of a send-queue when concatenation of data is performed to another depth of the send-queue in an absence of concatenation of data.

25. The network device of claim 21, wherein the metric is based on a type of network connection between the network device and another device.

26. The network device of claim 21, wherein selectively combining the data further comprises combining the data based on a conditional probability determined from a combination of the at least one metrics.

27. An apparatus for communicating over a network comprising:
   a processor that is operative to perform actions comprising:
      determining at least one metric that is a send-queue metric based on a comparison of a depth of a send-queue when concatenation of data is performed to another depth of the send-queue in an absence of concatenation of data;
      receiving a first packet of data for transmission over the network; and
      means for selectively combining data of the first packet with data of a second packet at least partly based on the at least one metric.

28. A network device for communicating data over a network, comprising:
   a transceiver to send and receive data over the network; and
   a processor that is operative to perform actions comprising:
      determining at least one metric, wherein at least one of the metrics is based on a comparison of a time data spends in a send-queue when concatenation is performed on the data to another time when other data spends in the send-queue in absence of concatenation of data;
      receiving data;
      selectively coalescing the received data with other data into a network packet based in part on the at least one metric; and
      sending the coalesced data, if a latency metric is above a latency threshold and a bandwidth metric is above a bandwidth threshold.

29. The network device of claim 28, wherein selectively coalescing the data further comprises selectively concatenating the data.

30. The network device of claim 28, wherein selectively coalescing the data further comprises selectively delaying sending the received data over the network for a time period, based in part on the at least one metric.

31. The network device of claim 28, wherein selectively coalescing the data further comprises selectively modifying a time period for sending the data, based in part on the at least one metric.

32. The network device of claim 31, wherein selectively modifying a time period includes selectively reducing the time period or selectively extending the time period.

* * * * *

UNITED STATES PATENT AND TRADEMARK OFFICE
CERTIFICATE OF CORRECTION

PATENT NO. : 7,873,065 B1  
APPLICATION NO. : 11/344687  
DATED : January 18, 2011  
INVENTOR(S) : Arindum Mukerji et al.

It is certified that error appears in the above-identified patent and that said Letters Patent is hereby corrected as shown below:

Title Page 2, in field (56), under (Other Publications), in column 2, line 6, delete "Verison" and insert -- Version --, therefor.

Title Page 2, in field (56), under (Other Publications), in column 2, line 23, delete "Cryoptography" and insert -- Cryptography --, therefor.

Title Page 2, in field (56), under (Other Publications), in column 2, line 28, delete "at.," and insert -- al., --, therefor.

Title Page 3, in field (56), under (Other Publications), in column 1, line 5, delete "Dowload" and insert -- Download --, therefor.

Title Page 3, in field (56), under (Other Publications), in column 1, line 29, delete "Coporation," and insert -- Corporation, --, therefor.

Title Page 3, in field (56), under (Other Publications), in column 2, line 22, delete "ai," and insert -- al., --, therefor.

Title Page 3, in field (56), under (Other Publications), in column 2, line 24, delete "ai," and insert -- al., --, therefor.

Signed and Sealed this  
Twenty-second Day of November, 2011

David J. Kappos  
*Director of the United States Patent and Trademark Office*